No. 897,347. PATENTED SEPT. 1, 1908.
A. O. BUCKIUS.
PIN AND CLEVIS DEVICE.
APPLICATION FILED DEC. 6, 1907.
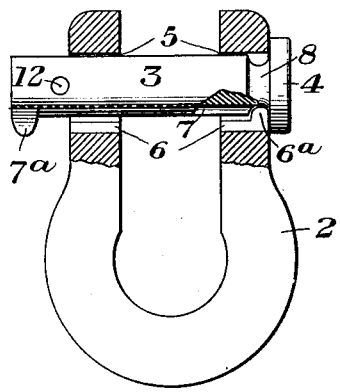
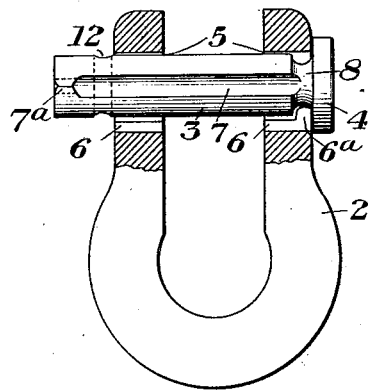
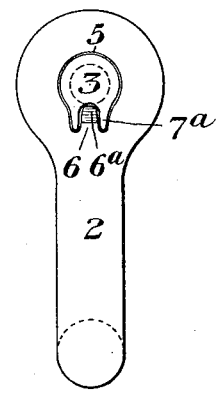
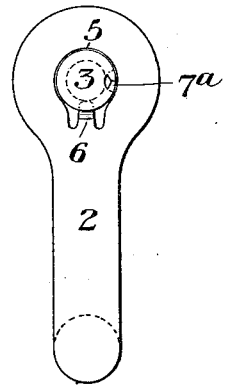
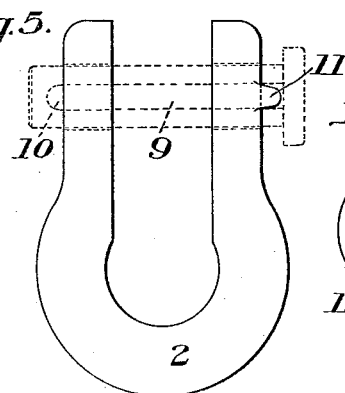
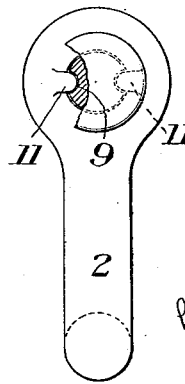
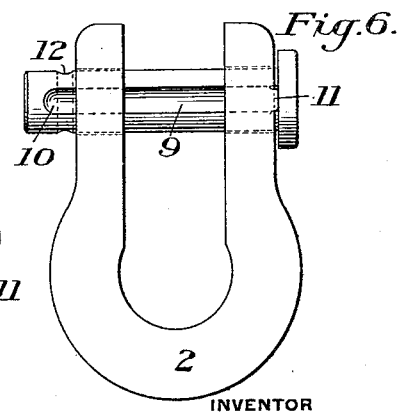
WITNESSES
R. A. Balderson
W. W. Swartz
INVENTOR
A. O. Buckius,
by Bakewell, Byrnes & Parmelee,
his Attys.

UNITED STATES PATENT OFFICE.

ALBERT O. BUCKIUS, OF CHICAGO, ILLINOIS, ASSIGNOR TO THE NATIONAL MALLEABLE CASTINGS COMPANY, OF CHICAGO, ILLINOIS, A CORPORATION OF OHIO.

PIN AND CLEVIS DEVICE.

No. 897,347.  Specification of Letters Patent.  Patented Sept. 1, 1908.

Application filed December 6, 1907. Serial No. 405,308.

*To all whom it may concern:*

Be it known that I, ALBERT O. BUCKIUS, of Chicago, Cook county, Illinois, have invented a new and useful Pin and Clevis Device, of which the following is a full, clear, and exact description, reference being had to the accompanying drawings, forming part of this specification, in which—

Figure 1 is a side view, partly in section, of one form of pin and clevis device embodying my invention, showing the pin before the closing lips at the end of the groove are bent down; Fig. 2 is a similar view showing the completed device with the pin turned ninety degrees from its position, as shown in Fig. 1; Figs. 3 and 4 are end views respectively of Figs. 1 and 2; and Fig. 5 is a side view showing a modification, with the pin in dotted lines, and showing the clevis before the securing lips for the pin have been bent into place; Fig. 6 is a side view of the form of device shown in Fig. 5 in its completed form; and Fig. 7 is an end view of the same partly in section.

My invention has relation to a pin and clevis which has been more particularly designed for use in connection with car couplers, but which can be used for a variety of other purposes.

In the ordinary pin and clevis devices in use, the pins are continually dropping out and becoming lost, which result in the couplers becoming inoperative and the clevises being lost from the chains.

My invention is designed to provide a device of this kind, in which the pin is so connected with the clevis as to at all times remain therewith.

Referring first to the form of the device shown in Figs. 1, 2, 3 and 4, the numeral 2 designates the clevis, and 3 the pin having the usual head 4 at one end. The eyes or apertures 5 in the arms of the clevis through which the pin loosely extends, are each provided with a tooth or lug 6, which is designed to fit loosely in a longitudinal groove 7 formed at one side of the pin, one of these teeth or lugs having the extension $6^a$. When the pin is inserted in the clevis, this groove is left open at the free end of the pin, but after the pin has been inserted it is closed by bending down the lips $7^a$, shown unbent in Fig. 1, to the closed position shown in Fig. 2. The inner edges of these lips will then form a stop for engagement with the lug extension $6^a$, which will effectually prevent the pin from falling out of the clevis. In order to permit the pin to rotate notwithstanding the engagement of the lug extension $6^a$ with the groove 7, the pin is provided adjacent to its head with a circumferential groove 8, into which the groove 7 opens, and which is of sufficient depth to clear the lug $6^a$ and permit the pin to freely rotate.

In the form of device shown in Figs. 5, 6 and 7, the pin is formed with a longitudinal groove 9 in both sides, which grooves are initially closed at the free end of the pin as is shown at 10. The arm of the clevis adjacent to the headed end of the pin is provided with the lips or lugs 11. After the pin has been inserted, these lips are bent inwardly from the open position shown in Fig. 5 to the position shown in Figs. 6 and 7, so as to engage with the grooves 9. This engagement will effectually prevent the pin from coming out of the clevis, since the closed ends of the grooves 10 will engage with these lugs and retain the pin. In this form the pin cannot be rotated. The free ends of the pins are provided with the usual holes 12 to receive cotter pins. The provision of the means described for insuring that the pins will at all times remain with the clevises, adds but little if anything to the cost of the devices, and obviates the loss of the pins and the difficulties arising therefrom.

I do not wish to limit myself to the precise means which I have herein shown and described for retaining the pins in the clevises, as various modifications thereof may be made without departing from the spirit and scope of my invention as defined in the appended claims.

I claim:—

1. In a pin and clevis device, a pin arranged to slide endwise in the clevis, and having a bendable portion whose position is changed after the pin is inserted to prevent the withdrawal of the pin from the clevis; substantially as described.

2. The combination of a pin and a clevis, the pin being arranged to slide endwise in the clevis, and one of the members of the pin and clevis having a bendable portion whose position is changed after the pin is inserted to prevent the withdrawal of the pin from the clevis; substantially as described.

3. The combination of a pin and a clevis, the pin being arranged to slide endwise in the clevis, and one of the members of the pin and clevis having a bendable portion whose position is changed after the pin is inserted and the other member having a coöperating stop member adapted to engage the said bendable portion in its changed position to prevent the withdrawal of the pin from the clevis; substantially as described.

4. In a pin and clevis device, a clevis having eyes, and a pin arranged to slide in said eyes, the pin and clevis having integral coöperating stop portions whose relative position can be changed after the pin has been inserted to prevent the withdrawal of the pin; substantially as described.

5. In a pin and clevis device, a clevis having eyes, and a pin arranged to slide in said eyes, said pin having a longitudinal groove, and the clevis having a projection arranged to engage said groove, said pin having a bendable portion which can be moved to close one end portion of the groove after the pin has been inserted; substantially as described.

6. In a pin and clevis device, a pin having a longitudinal groove, and also having lips at its free end arranged to be bent to close the end portion of the groove, and a clevis having a tooth or lug adapted to engage said groove, said pin also having a circumferential groove adjacent to its head and into which the longitudinal groove opens; substantially as described.

In testimony whereof, I have hereunto set my hand.

ALBERT O. BUCKIUS.

Witnesses:
CLAYTON MARK,
S. E. SCHOOLEY.